United States Patent
Fouganthine

(10) Patent No.: US 11,433,864 B2
(45) Date of Patent: Sep. 6, 2022

(54) CONTAINER UNIT FOR BRAKE FLUID AND A SYSTEM FOR CONTROLLING THE FLOW OF BRAKE FLUID

(71) Applicant: Ningbo Geely Automobile Research & Development Co., Ltd., Ningbo (CN)

(72) Inventor: Elin Fouganthine, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 58 days.

(21) Appl. No.: 16/705,708

(22) Filed: Dec. 6, 2019

(65) Prior Publication Data
US 2020/0108814 A1  Apr. 9, 2020

Related U.S. Application Data

(63) Continuation of application No. PCT/CN2018/085118, filed on Apr. 28, 2018.

(30) Foreign Application Priority Data

Jun. 22, 2017 (EP) .................................... 17177373

(51) Int. Cl.
*B60T 11/22* (2006.01)
*B60T 11/26* (2006.01)
(Continued)

(52) U.S. Cl.
CPC .............. *B60T 11/22* (2013.01); *B60T 11/26* (2013.01); *B60T 11/28* (2013.01); *B60T 8/17558* (2013.01); *B60T 17/06* (2013.01)

(58) Field of Classification Search
CPC .......... B60T 11/22; B60T 11/26; B60T 11/28; B60T 11/32; B60T 11/323; B60T 17/06; B60T 17/22
(Continued)

(56) References Cited

U.S. PATENT DOCUMENTS

| 2,574,969 | A |   | 11/1951 | Heidloff |
| 3,206,933 | A | * | 9/1965 | Dega ....................... B60T 11/22 141/346 |
| 3,233,411 | A | * | 2/1966 | Schubert ................. B60T 11/22 141/330 |

(Continued)

FOREIGN PATENT DOCUMENTS

| CN | 105189226 A | 12/2015 |
| CN | 106838388 A | 6/2017 |

(Continued)

OTHER PUBLICATIONS

International Search Report and Written Opinion from corresponding International Patent Application No. PCT/CN2018/085118, dated Jul. 25, 2018, 10 pages.
(Continued)

*Primary Examiner* — Thomas J Williams
(74) *Attorney, Agent, or Firm* — Tucker Ellis LLP

(57) ABSTRACT

A container unit for brake fluid in a vehicle hydraulic brake system and connectable to a hydraulic component of the brake system, and includes: a storage chamber for brake fluid, the storage chamber having a flow channel between the storage chamber and the hydraulic component, the storage chamber and flow channel define an inner space of the container unit; a displaceable valve unit regulates flow of brake fluid in and out of the storage chamber through the flow channel, the valve unit in an open position is displaced to allow brake fluid to flow when the container unit is connected to the hydraulic component, and the valve unit in a closed position is displaced to prevent outflow of brake fluid when the container unit is disconnected from the hydraulic component. The valve unit in the open and closed positions is fully enclosed within the inner space of the container unit.

14 Claims, 6 Drawing Sheets

(51) Int. Cl.
*B60T 11/28* (2006.01)
*B60T 8/1755* (2006.01)
*B60T 17/06* (2006.01)

(58) Field of Classification Search
USPC .................................................. 60/585, 588
See application file for complete search history.

(56) References Cited

U.S. PATENT DOCUMENTS

| | | |
|---|---|---|
| 3,952,918 A | 4/1976 | Poitras et al. |
| 4,934,144 A | 6/1990 | Larin |
| 6,928,814 B2 * | 8/2005 | Lange .................... B60T 11/26 60/585 |
| 9,656,645 B2 * | 5/2017 | Krebs .................... B60T 11/26 |
| 2021/0179048 A1 * | 6/2021 | Krebs .................. B60T 11/323 |

FOREIGN PATENT DOCUMENTS

| | | | | |
|---|---|---|---|---|
| DE | 10234541 A1 | 2/2004 | | |
| FR | 3006650 A1 | 12/2014 | | |
| GB | 1008837 A | * 11/1965 | ............. | B60T 11/22 |
| GB | 2230831 B | * 2/1993 | ............. | B60T 11/22 |
| JP | S57194149 A | 11/1982 | | |
| WO | 2016008955 A1 | 1/2016 | | |
| WO | 2016096659 A1 | 6/2016 | | |

OTHER PUBLICATIONS

Extended European Search Report from corresponding Eurpean Patent Application No. 17177373.2, dated Dec. 13, 2017, 6 pages.

* cited by examiner

CONTAINER UNIT FOR BRAKE FLUID AND A SYSTEM FOR CONTROLLING THE FLOW OF BRAKE FLUID

RELATED APPLICATION DATA

This application is a continuation of International Patent Application No. PCT/CN2018/085118, filed Apr. 28, 2018, which claims the benefit of European Patent Application No. 17177373.2, filed Jun. 22, 2017, the disclosures of which are incorporated herein by reference in their entireties.

TECHNICAL FIELD

The present disclosure relates to a container unit for brake fluid in a vehicle hydraulic brake system, where the container unit is connectable to and adapted for being in fluid communication with a hydraulic component of the brake system. The container unit comprises a storage chamber for storing the brake fluid, where the storage chamber has at least one flow channel allowing fluid communication between the storage chamber and the hydraulic component. At least one displaceable valve unit is regulating the flow of brake fluid out from and into the storage chamber through the at least one flow channel. The at least one valve unit is in an open position displaced to allowing brake fluid to flow out from and into the storage chamber when the container unit is connected to the hydraulic component, and the at least one valve unit is in a closed position displaced to preventing brake fluid from flowing out from the storage chamber when the container unit is disconnected from the hydraulic component. The disclosure further relates to a system for controlling the flow of brake fluid.

BACKGROUND

In today's vehicles a brake fluid container unit is used for storing and controlling brake fluid used in the vehicle's hydraulic brake system. The brake fluid container is connectable to and adapted for being in fluid communication with a hydraulic component of the brake system, such as a master cylinder. Brake fluids are often toxic and flammable, and due to these properties it is desirable to prevent the brake fluid from leaking out from the brake fluid container when the brake fluid container is disconnected or detached from the master cylinder. The brake fluid container may for example be detached from the master cylinder during maintenance of the vehicle's brake system. The brake fluid container may also be unintentionally detached from the master cylinder during a crash or accident. In a crash situation, the brake fluid can leak out from the brake fluid container and cause fire if the brake fluid comes in contact with hot engine parts of the vehicle. The brake fluid leaking out from the brake fluid container may also contaminate the surrounding environment.

To avoid that the brake fluid is leaking out from the brake fluid container when being detached from the vehicle, the brake fluid container can be arranged with a safety valve. WO 2016/008955 A1 discloses a brake fluid container for a master cylinder in a hydraulic brake system, where a safety valve is provided to ensure that an opening of the brake fluid container closes when the brake fluid container is detached from the master cylinder, for example in case of an accident.

A valve unit of the type disclosed in WO 2016/008955 A1 may prevent that the brake fluid is leaking out from the brake fluid container when being detached from the master cylinder. However, a valve unit of this type cannot fully prevent leakage when the brake fluid container is impacted by surrounding vehicle components after being disconnected from the master cylinder in a crash or accident. This is because parts of the valve unit may be impacted by surrounding vehicle components so that the valve opens and the brake fluid can leak out. Another problem is that the valve unit may be dislocated in relation to the brake fluid container when assembling the brake fluid container and the master cylinder.

There is thus a need for an improved container unit for brake fluid and system for controlling the flow of brake fluid.

SUMMARY

An object of the present disclosure is to provide a container unit for brake fluid and a system for controlling the flow of brake fluid where the previously mentioned problems are avoided. This object is at least partly achieved by the features of the independent claims. The dependent claims contain further developments of the container unit for brake fluid and the system for controlling the flow of brake fluid.

The disclosure concerns a container unit for brake fluid in a vehicle hydraulic brake system, where the container unit is connectable to and adapted for being in fluid communication with a hydraulic component of the brake system. The container unit comprises a storage chamber for storing the brake fluid, where the storage chamber has at least one flow channel allowing fluid communication between the storage chamber and the hydraulic component. The storage chamber together with the at least one flow channel is defining an inner space of the container unit. At least one displaceable valve unit is regulating the flow of brake fluid out from and into the storage chamber through the at least one flow channel. The at least one valve unit is in an open position displaced to allowing brake fluid to flow out from and into the storage chamber when the container unit is connected to the hydraulic component, and the at least one valve unit is in a closed position displaced to preventing brake fluid from flowing out from the storage chamber when the container unit is disconnected from the hydraulic component. The at least one valve unit is in the open and closed positions fully enclosed within the inner space of the container unit.

Advantages with these features are that the container unit with the valve unit can prevent leakage and dislocation of the valve unit when the container unit is impacted by surrounding components after have being disconnected from the hydraulic component in a crash or during maintenance of the hydraulic brake system of the vehicle. Since the valve unit in the open and closed positions is fully enclosed within the inner space of the container unit, the valve unit is prevented from being impacted by surrounding vehicle components, which will avoid that the brake fluid can leak out when the container unit is disconnected from the hydraulic component.

According to an aspect of the disclosure, the at least one valve unit comprises a valve member attached to a valve piston, where the valve piston is displacing the valve member between the open and closed positions, so that the valve member in the open position is allowing brake fluid to flow out from and into the storage chamber and in the closed position is preventing brake fluid from flowing out from the storage chamber.

These features provide a simple construction of the valve unit with few components involved. When the valve piston is displaced, the valve member will also be displaced. The valve member has a sealing function and is preventing that the brake fluid is leaking out from the storage chamber when the valve unit is in the closed position, and the valve member will when being displaced into the open position of the valve unit allow the brake fluid to flow out from the storage chamber.

According to another aspect of the disclosure, the at least one valve unit further comprises a spring connected to the valve piston and the storage chamber, where the spring is displacing the valve member from the open position to the closed position when disconnecting the container unit from the hydraulic component. The spring will function as a force member that is closing the valve unit when the container unit is disconnected from the hydraulic component. When connecting the container unit to the hydraulic component, the spring is loaded when the valve unit is displaced into the open position, and when disconnecting the container unit from the hydraulic component, the spring forces the valve unit into the closed position so that brake fluid is prevented from leaking out from the storage chamber.

According to a further aspect of the disclosure, the spring has in the open position a higher compression than in the closed position. The spring may be a compression coil spring or helical spring, commonly used in valve applications. When the valve unit is displaced from the closed position to the open position, the spring is compressed, and in this way the spring has a higher compression is the open position than in the closed position.

According to an aspect of the disclosure, the valve piston has a lower piston surface that is adapted for interacting with the hydraulic component. The valve member is displaced into the open position during interaction between the lower piston surface and the hydraulic component when the container unit is connected to the hydraulic component. The lower piston surface is as disclosed arranged on the valve piston and through the interaction between the lower piston surface and the hydraulic component, the valve unit can be displaced from the closed position to the open position when the valve unit is connected to the hydraulic component. In the same way, the valve unit can be displaced from the open position to the closed position when the valve unit is disconnected from the hydraulic component through the interaction between the lower piston surface and the hydraulic component.

According to another aspect of the disclosure, each of the at least one flow channel has an inner flow opening connecting the at least one flow channel to the storage chamber and an outer flow opening. The flow openings are arranged to allow the brake fluid to flow between the storage chamber and the hydraulic component. The flow channel may be formed as a pipe-like structure arranged between the inner flow opening and the outer flow opening.

According to another aspect of the disclosure, the valve member is arranged in connection to the inner flow opening and the lower piston surface is arranged in connection to the outer flow opening. In this way, the valve unit is arranged at least partly within the flow channel, and the inner flow opening may be arranged so that it has the function of a valve seat that is cooperating with the valve member.

According to a further aspect of the disclosure, the lower piston surface is adapted for interacting with a protrusion arranged in a flow port of the hydraulic component, where the protrusion is protruding into the flow channel when the container unit is connected to the hydraulic component, and where the flow channel is adapted for receiving the protrusion when the container unit is connected to the hydraulic component. The protrusion is displacing the valve unit from the closed position to the open position when the container unit is connected to the hydraulic component. The protrusion may be arranged so that it is pushing the valve unit in a direction into the storage chamber when the container unit is connected to the hydraulic component.

According to another aspect of the disclosure, the at least one flow channel has a pipe-like configuration with a wall section, wherein the valve piston is arranged inside the wall section of the at least one flow channel. The wall section is forming the pipe-like structure of the flow channel and the wall section is arranged to encompass at least a part of the valve piston of the valve unit.

According to a further aspect of the disclosure, the wall section of the at least one flow channel is adapted for being connected to the hydraulic component. The wall section is thus configured to connect the container unit to the hydraulic component. The hydraulic component may be arranged with suitable connection members with seals that are receiving the wall sections of the flow channels.

According to an aspect of the disclosure, the at least one flow channel is arranged in a bottom wall of the storage chamber. Through this arrangement, the brake fluid can easily flow out from the storage chamber.

According to another aspect of the disclosure, the container unit comprises two flow channels, where each flow channel is provided with one valve unit.

The disclosure further concerns a system for controlling the flow of brake fluid in a vehicle hydraulic brake system, where the system comprises a container unit as described above, and a hydraulic component. The hydraulic component is interacting with the container unit when the container unit is connected to the hydraulic component.

According to an aspect of the disclosure, the container unit in the system comprises a storage chamber having at least one flow channel with a valve unit, and the hydraulic component comprises at least one flow port with a protrusion, wherein the at least one flow channel is connectable to the at least one flow port. The protrusion is protruding into the flow channel and displacing the valve unit into an open position when the container unit is connected to the hydraulic component, and the flow channel is adapted for receiving the protrusion when the container unit is connected to the hydraulic component.

According to another aspect of the disclosure, the hydraulic component of the system is a tandem master cylinder. Tandem master cylinders are common in modern vehicle applications, where dual-circuit braking systems with power-assisted braking are used. The tandem master cylinder converts the output force of a brake unit into hydraulic pressure, and combines the effect of two serially switched master cylinders in one cylinder housing. The container unit with two flow channels is specifically designed for interacting with a tandem master cylinder in a dual-circuit brake system.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
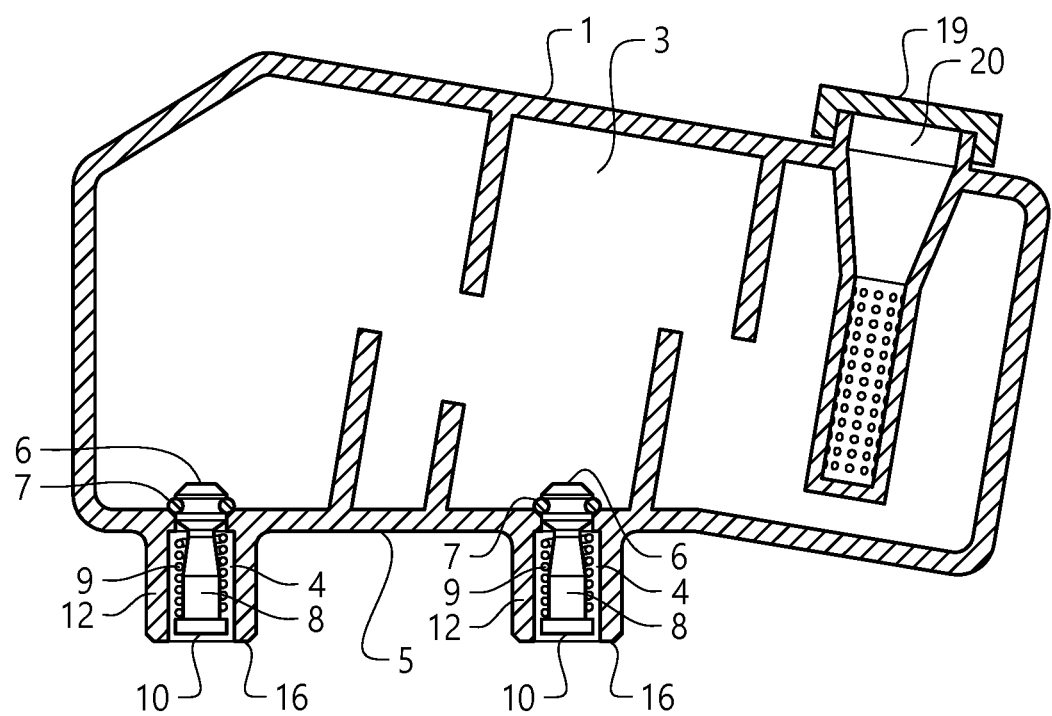
FIG. 1 shows schematically, a cross-section of a container unit for brake fluid according to the disclosure.

FIG. 1 schematically shows a cross-section of a container unit 1 for brake fluid. Container units for brake fluid are commonly used in vehicle applications where the vehicle is equipped with a hydraulic brake system.

The container unit 1 for brake fluid is a type of reservoir used for storing the brake fluid in the hydraulic brake system.

Hydraulic brake systems are well known in the art and are designed for transferring braking power from a brake pedal to the vehicle brakes through the use of a brake fluid. When the brake pedal is pressed, a pushrod normally exerts force on a piston in a master cylinder, which is causing an increase in the brake fluid pressure of the system. The increase in the brake fluid pressure is applying a braking force on the vehicle brakes. In a disc brake system, brake calipers with brake pads are used to exert the braking force on brake discs. In a drum brake system, brake shoes are used to exert the braking force on brake drums.

Figure 2A:
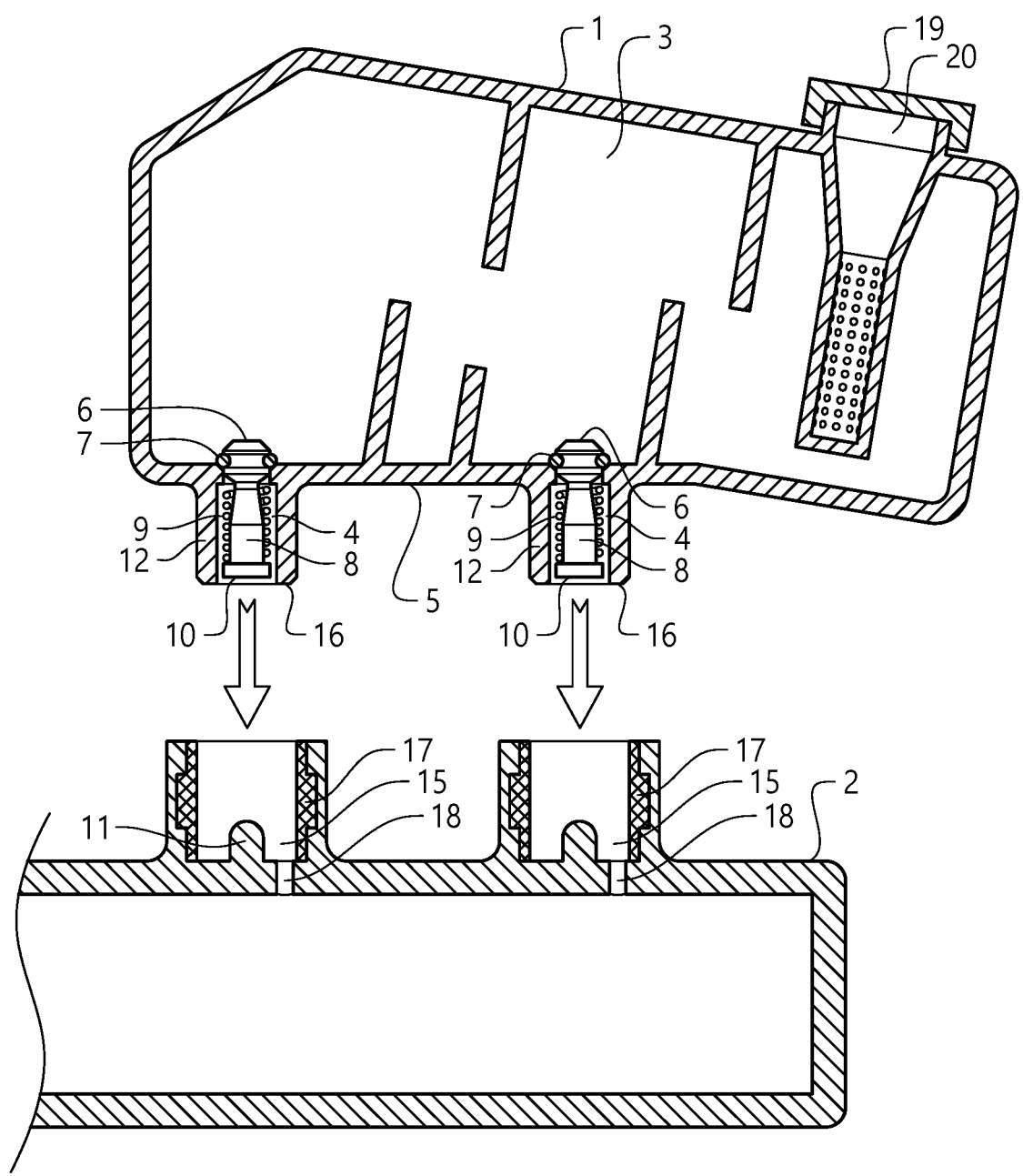
FIG. 2A-B show schematically, cross-sections of the container unit for brake fluid and a hydraulic component according to the disclosure.
Figure 2B:
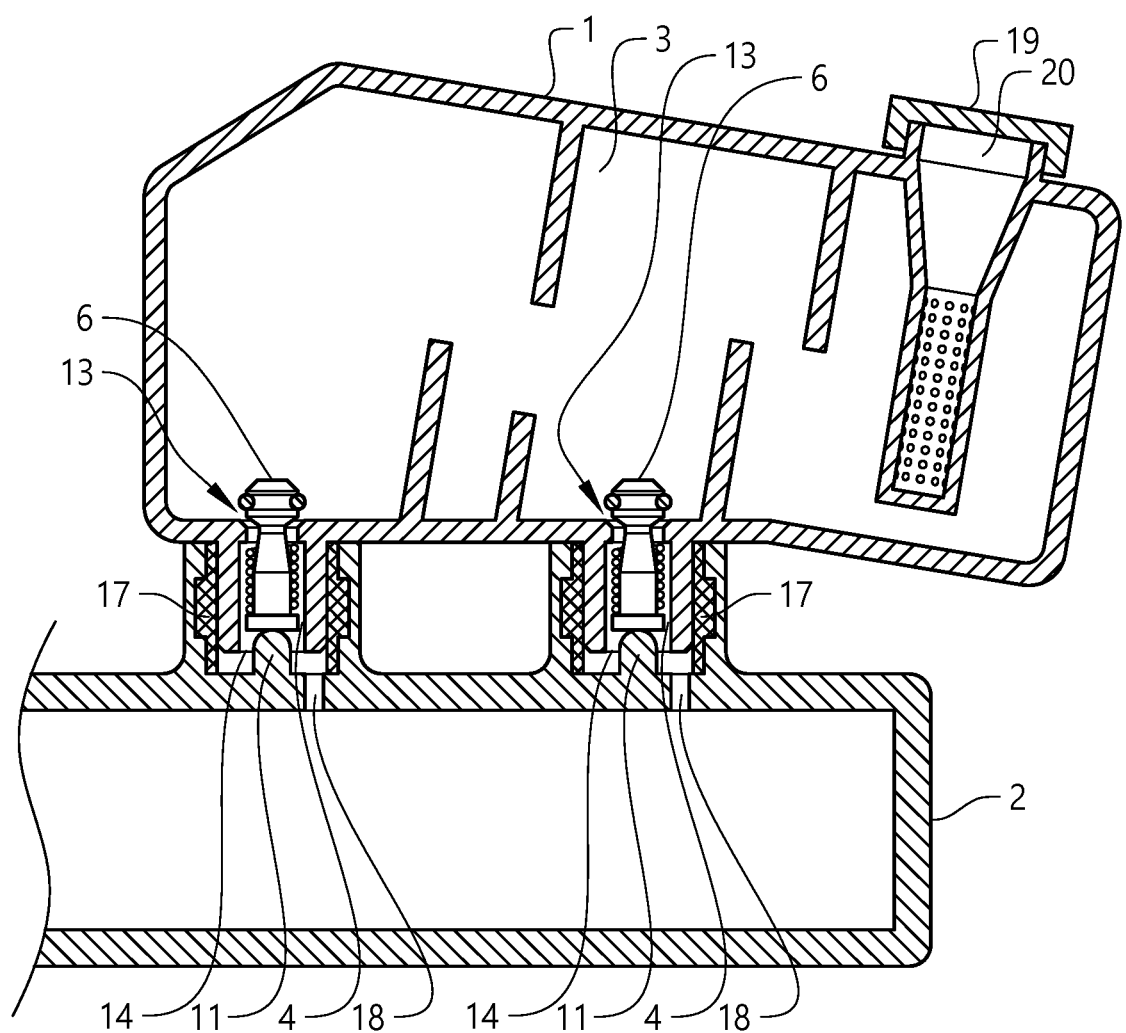

The container unit 1 is connectable to and adapted for being in fluid communication with a hydraulic component 2 of the brake system, as shown in FIGS. 1, 2A and 2B. As described above, the hydraulic component 2 may be a master cylinder, which is generating the braking power by increasing the pressure of the brake fluid in the hydraulic brake system. More specifically, the hydraulic component 2 is a tandem master cylinder. Tandem master cylinders are common in modern vehicle applications, where dual-circuit braking systems with power-assisted braking are used. The tandem master cylinder converts the output force of a brake unit into hydraulic pressure, and combines the effect of two serially switched master cylinders in one cylinder housing.

As further shown in FIG. 1, the container unit 1 comprises a storage chamber 3 for storing the brake fluid. The storage chamber 3 has an inner volume for holding the brake fluid, and the brake fluid can be filled into the storage chamber via a reclosable filling opening 20 having a removable lid 19. The storage chamber 3 may be made of any material suitable for holding the brake fluid. Brake fluids may be toxic and flammable, and many brake fluids are also hygroscopic and absorb moisture from the surrounding environment. The container unit 1 is also mounted in the vehicle's engine compartment, where it can be exposed to dirt, humidity and high temperatures. The storage chamber 3 may therefore be made of a suitable plastic material or a reinforced plastic material. Other possible materials are for example cast metal or other metallic materials, and composite materials.

The storage chamber 3 is provided with at least one flow channel 4, which is allowing fluid communication between the storage chamber 3 and the hydraulic component 2. The brake fluid can thus flow between the container unit 1 and the hydraulic component 2 through the at least one flow channel 4, when the container unit 1 is connected to and in fluid communication with the hydraulic component 2. In FIG. 2A, the container unit 1 is shown in a position where it is disconnected from the hydraulic component 2, and in FIG. 2B, the container unit 1 is connected or attached to the hydraulic component 2. The at least one flow channel 4 may for example be arranged in a bottom wall 5 of the storage chamber 3. In the embodiment shown in FIG. 1, the storage chamber 3 is provided with two flow channels 4 arranged in the bottom wall 5 of the storage chamber, and the hydraulic component 2 shown is a tandem master cylinder. The two flow channels 4 are allowing fluid communication between the inner volume of the storage chamber 3 and the two serially switched master cylinders in the tandem master cylinder, when the container unit 1 is in fluid communication with the tandem master cylinder.

The storage chamber 3 is together with the at least one flow channel 4 defining an inner space of the container unit 1. The at least one flow channel 4 is forming a part of the storage chamber 3 and may have a pipe-like configuration with a wall section 12. The wall section 12 is defining an inner space of the flow channel, and the brake fluid can flow out from and into the storage chamber 3 through the at least one flow channel 4 when the container unit 1 is in fluid communication with the hydraulic component 2. The at least one flow channel 4 may have a circular cross-sectional shape. Other cross-sectional shapes are also possible depending on the design of the at least one flow channel 4. The wall section 12 is at least partly extending in a direction outwards from the storage chamber, and is constructed as an integrated part of the storage chamber 3. The at least one flow channel 4 may for example be formed together with the storage chamber 3 through an injection moulding process when manufacturing the storage chamber 3.

In the embodiment shown in FIG. 1, the two flow channels 4 are extending in a downwards direction from the bottom wall 5 of the storage chamber 3. The outwardly extending sections of the wall sections 12 are adapted for interacting with the hydraulic component 2 as will be further described below. The container unit 1 can be releasably connected to the hydraulic component with suitable fastening means. The fastening means can be of different types depending on the construction of the container unit 1 and the hydraulic component 2. The container 1 unit may be provided with a mounting bracket or similar mounting arrangement that is interacting with a fastening arrangement on the hydraulic component 2. The fastening arrangement on the hydraulic component 2 may for example be a receiving surface with a threaded hole so that the mounting arrangement of the container unit can be fastened to the hydraulic component with a fastening member, such as a bolt, where a threaded part of the bolt is interacting with the threaded hole in the hydraulic component 2. The container unit 1 may be connected or attached to the hydraulic component 2 with one or more fastening members, and the fastening arrangement may be located on one or more places on the container unit 1 and the hydraulic component 2 respectively, depending on the design of the hydraulic brake system.

The inner volume of the storage chamber 3 together with the inner volume of the at least one flow channel 4 are defining the inner space of the container unit 1. In the embodiment shown in FIG. 1, the inner space is thus the space or volume of the storage chamber 3 together with the space or volume of the two flow channels 4. The inner space of the container unit 1 is the total inner volume encompassed by the wall of the storage chamber 3 and the wall sections 12 of the flow channels 4. The inner space of each of the flow channels 4 can be seen as the inner volume enclosed within the flow channel 4, from an inner flow opening 13 of the flow channel 4 connected to the storage chamber 3 to an outer flow opening 14 at an outer edge 16 of the flow channel 4, which outer edge 16 is forming an outer periphery of the flow channel 4.

As described above, each of the at least one flow channels 4 has the inner flow opening 13 connecting the at least one flow channel 4 to the inner volume of the storage chamber 3, and the outer flow opening 14 arranged in connection to the outer edge 16 on the outer part of the flow channel 4 extending in a direction outwards from the storage chamber 3, as shown in FIG. 1.

Figure 4A:
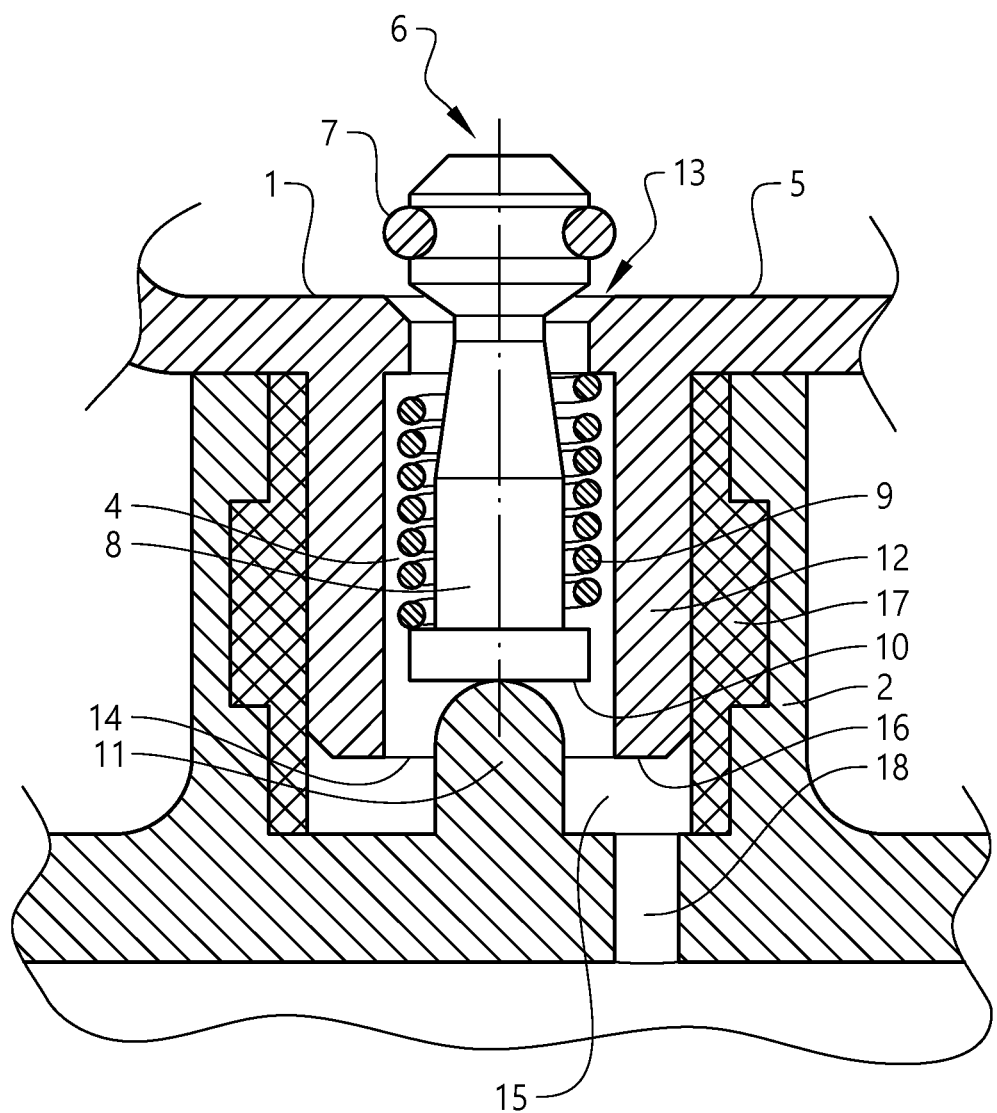
FIG. 4A-B show schematically, valve units for controlling the flow of brake fluid into and out from the container unit for brake fluid according to the disclosure.

The container unit 1 further comprises at least one displaceable valve unit 6 that is regulating the flow of brake fluid out from and into the storage chamber 3 through the at least one flow channel 4. One displaceable valve unit 6 may be arranged in each of the two flow channels 4, and the two valve units 6 are regulating the flow of brake fluid out from and into the storage chamber 3 through the two flow channels 4. In the disclosed embodiments, the container unit 1 comprises two flow channels 4, where each flow channel 4 is provided with one valve unit 6. Each of the valve units 6 can be displaced between an open position and a closed position. In FIG. 4A, the valve unit 6 is shown in the open position, and in FIG. 4B, the valve unit 6 is shown in the closed position. As shown in FIG. 1, the valve units 6 are each arranged in one flow channel 4.

The at least one valve unit 6 is in the open position displaced to allow the brake fluid to flow out from and into the storage chamber 3 when the container unit 1 is connected to the hydraulic component 2, as shown in FIG. 4A. In the open position, the valve unit 6 is allowing the brake fluid from flowing out from and into the storage chamber 3 through the flow channels 4. In this way the brake fluid can flow between the container unit 1 and the hydraulic component 2 when the container unit 1 is connected to the hydraulic component 2.

Figure 4B:
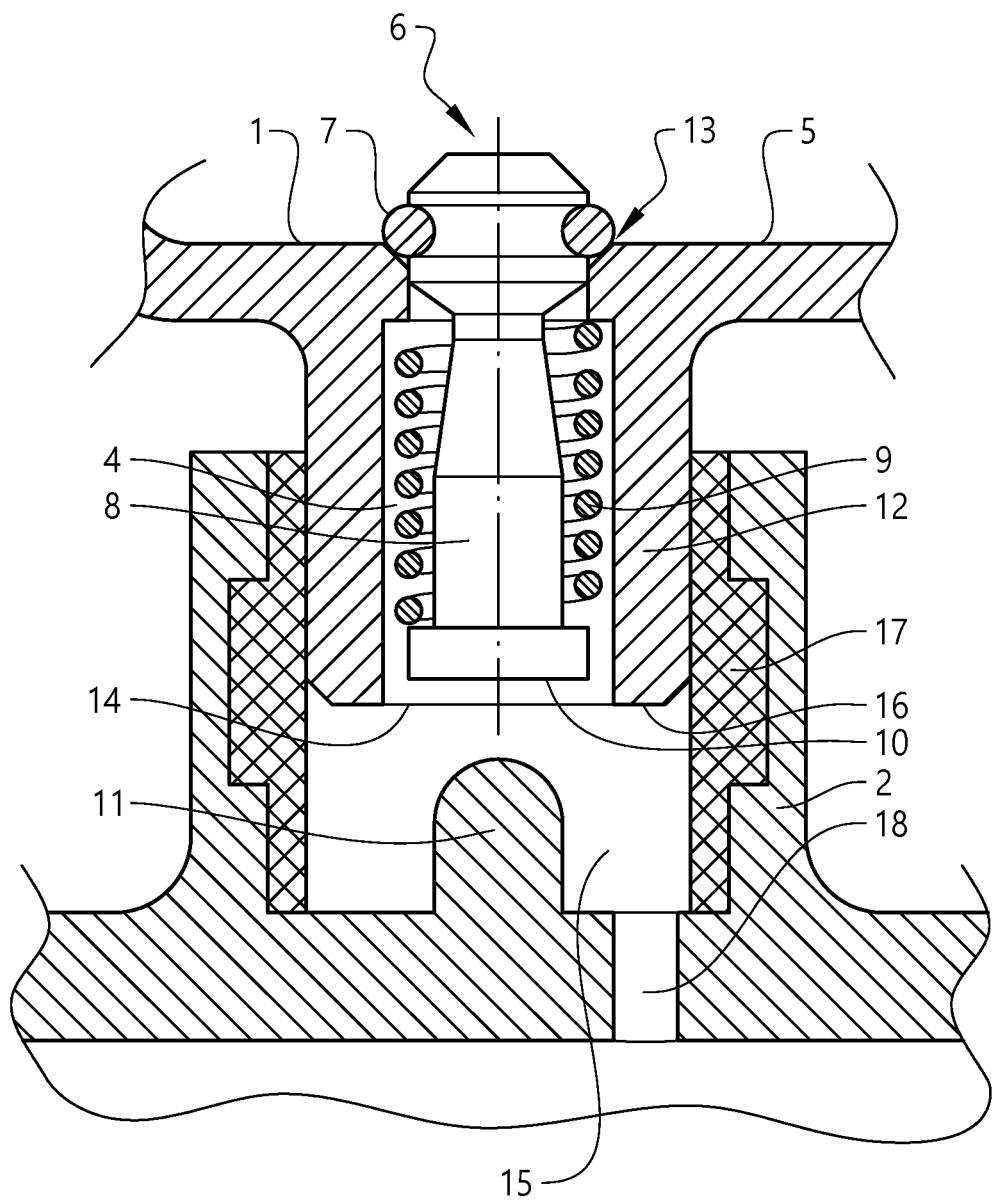

The at least one valve unit 6 is in a closed position displaced to prevent brake fluid from flowing out from the storage chamber 3 when the container unit 1 is disconnected from the hydraulic component 2, as shown in FIG. 4B. In the closed position, the valve unit 6 is blocking the flow of brake fluid out from the storage chamber 3. This prevents the brake fluid from flowing out from the container unit 1, for example if the container unit 1 is disconnected from the hydraulic component 2 during maintenance of the hydraulic brake system, or if the container unit 1 is unintentionally disconnected from the hydraulic component 2 in an accident or crash.

To prevent that the at least one valve unit 6 is accidentally opened, the at least one valve unit 6 is in the open and closed positions fully enclosed within the inner space of the container unit 1. Through this arrangement of the at least one valve unit 6 fully enclosed within the inner space of the container unit 1, there are no parts of the at least one valve unit 6 extending out from the container unit 1 so that an object cannot displace the at least one valve unit 6 into the open position when the container unit is not connected to the hydraulic component.

The at least one valve unit 6 comprises a valve member 7 attached to a valve piston 8. The at least one flow channel 4 may have a pipe-like configuration formed by the wall section 12. The valve piston 8 is arranged inside the wall section 12 of the at least one flow channel 4, when the valve unit 6 is attached to the container unit 1. The valve member 7 is adapted to prevent the brake fluid from flowing out from the storage chamber 3 when the at least one valve unit 6 is in the closed position. The valve member 7 may be arranged as a valve disc or sealing unit attached to the valve piston 8, and the valve member 7 may have a disc-like or circular shape that can interact with the inner flow opening 13 of the flow channel 4. The inner flow opening 13 may be arranged as a valve seat with a shape or configuration that is interacting with the valve member 7. In the closed position, the valve member 7 may be arranged so that it is sealing the storage chamber 3 from the flow channel 4, so that no brake fluid is allowed to flow out from the storage chamber 3 into the flow channel 4. The valve member 7 may be formed as an integrated part with the valve piston 8 or as a separate part arranged on the valve piston 8. The valve member 7 may further be provided with a sealing member of a suitable material such as an elastomeric material with good sealing properties to secure that the valve unit 6 in the closed position is preventing brake fluid to flow out from the storage chamber 3. The valve member 7 may as an alternative, not shown in the figures, also be arranged so that it is sealing the storage chamber 3 and an upper part of the flow channel 4 from the rest of the flow channel 4.

In the closed position, the valve member 7 of the valve unit 6 is in contact with the inner flow opening 13 of the flow channel 4, as shown in FIGS. 1, 2A and 4B. In the open position, the valve member 7 of the valve unit 6 is displaced in a direction into the storage chamber 3, so that the valve member is not in contact with the inner flow opening 13 of the flow channel 4. In the open position, the brake fluid is allowed to flow out from the storage chamber 3 into the flow channel 4. The closed position is shown in FIGS. 2B and 4A. The valve piston 8 is adapted to displacing the valve member 7 between the open and closed positions, so that the valve member 7 in the open position is allowing brake fluid to flow out from and into the storage chamber 3 and in the closed position is preventing brake fluid from flowing out from the storage chamber 3. The valve piston 8 is arranged as an elongated rod or stem, and as shown in FIGS. 1, 2A, 2B, 4A and 4B, the valve piston 8 is extending into the flow channel 4. In the open position, the brake fluid is allowed to flow through the flow channel 4, past the valve piston 8 and out through the outer flow opening 14.

The at least one valve unit 6 further comprises a spring 9. The spring 9 may be a compression coil spring or helical spring, commonly used in valve applications, and the spring is at one end connected to the valve piston 8 and at the other end connected to the flow channel 4 of the storage chamber 3. As shown in FIGS. 4A and 4B, the lower part of the spring 9 may be connected to the lower part of the valve piston 8 with suitable connection means, such as a protrusion or similar arrangement on the lower part of the valve piston 8. The upper part of the spring 9 may be attached to the bottom wall 5 of the storage chamber 3 or to the flow channel 4 in connection to the inner flow opening 13 with suitable connection means, such as a groove or protrusion arranged in the flow channel in connection to the inner flow opening 13. When the valve member 7 is pushed in a direction into the storage chamber 3, from the closed position to the open position, the spring 9 is compressed, so that the spring 9 in the open position has a higher compression than in the closed position, as illustrated in FIGS. 4A and 4B. With this arrangement, the spring 9 can displace the valve member 7 through spring action from the open position to the closed position, when the container unit 1 is disconnected from the hydraulic component 2.

As for example shown in FIGS. 4A and 4B, the valve piston 8 has a lower piston surface 10 adapted for interacting with the hydraulic component 2. The valve member 7 is displaced into the open position during interaction between the lower piston surface 10 and the hydraulic component 2 when the container unit 1 is connected to the hydraulic component 2. As described above, the valve member 7 is arranged in connection to the inner flow opening 13. The lower piston surface 10 is arranged on the lower end of the valve piston 8, as shown in FIGS. 4A and 4B, so that the lower piston surface 10 is located on the opposite end of the valve piston 8 in relation to the valve member 7. In this way, the lower piston surface 10 is arranged in connection to the outer flow opening 14 when the valve unit 6 is mounted in the flow channel 4.

Figure 3:
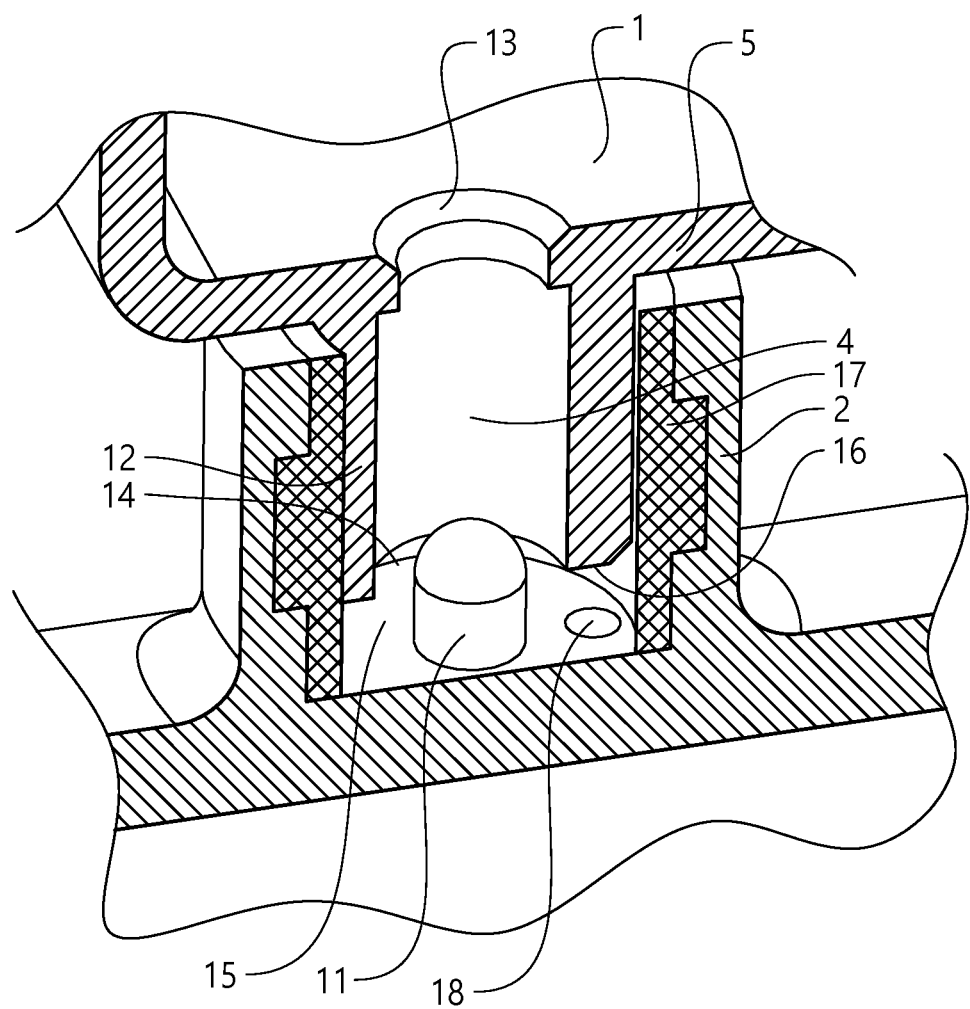
FIG. 3 shows schematically, a cross-section in a perspective view of a part of the container unit for brake fluid and a hydraulic component according to the disclosure.

The lower piston surface 10 is adapted for interacting with a protrusion 11 arranged in a flow port 15 of the hydraulic component 2, as shown in FIG. 3. The protrusion 11 may be constituted by a piece of material integrated in the flow port structure or as an alternative the protrusion 11 may be arranged as a separately attached piece of material. Any suitable material can be used for the protrusion 11, such as for example metals or plastic materials. The protrusion 11 may have any suitable shape so that the protrusion 11 can interact with the lower piston surface 11 when the container unit 1 is connected to the hydraulic component 2. When the container unit 1 is connected to the hydraulic component 2, the protrusion 11 is pushing the valve unit 1 in a direction into the storage chamber 3. More specifically, the protrusion 11 is interacting with the lower piston surface 10 so that when the container unit 1 is connected to the hydraulic component, the protrusion 11 is pushing the valve piston 8 in a direction into the storage chamber 3 so that the valve unit 6 is dislocated from the closed position to the open position. In the open position, the valve member 7 of the valve unit 6 is dislocated from the inner flow opening 13 so that the brake fluid can flow into the flow channel 4. The spring 9 is also being compressed when the container unit 1 is connected to the hydraulic component 2 through the displacement of the valve piston 8. The protrusion 11 is thus, as shown in FIGS. 2B and 4A, protruding into the flow channel 4 when the container unit 1 is connected to the hydraulic component 2, and the flow channel 4 is adapted for receiving the protrusion 11 when the container unit 1 is connected to the hydraulic component 2. The dimensions of the protrusion 11 may vary depending on the specific design of the hydraulic component 2 and the container unit 1 including the valve unit 6. However, the dimensions of the protrusion should be chosen so that the valve unit is displaced a distance long enough to allow a desired flow of fluid from the storage chamber 3 into the flow channel 4.

The wall section 12 of the at least one flow channel 4 is adapted for being connected to the hydraulic component 2. The flow port 15 of the hydraulic component 2 may be arranged with a wall or similar structure, which is adapted to receive the wall section 12 of the flow channel 4, when the container unit 1 is connected to the hydraulic component 2, which is illustrated for example in FIGS. 2B and 4A. The flow port 15 of the hydraulic component is designed to allow the brake fluid to flow from the container unit 1 into the hydraulic component and one or more fluid channels 18 may be arranged in the hydraulic component 2. A sealing member 17 may also be arranged in the flow port 15, which sealing member 17 is arranged for establishing a fluid tight seal between the outer surface of the wall section 12 of the flow channel 4 and the flow port 15. The sealing member 15 may be made of any suitable material such as rubber or other elastomeric materials.

When the container unit 1 is disconnected from the hydraulic component 2, for example during maintenance of the hydraulic brake system or when being disconnected in a crash or accident, the spring 9 of each valve unit 6 is pushing the valve unit 6 from the open position to the closed position. In the closed position, the valve member 7 is interacting with the inner flow opening to establish a tight seal, which is preventing the brake fluid to flow out from the container unit 1. Since the valve units 6 in both the open and closed positions are fully enclosed within the inner space of the container unit 1 there is no risk that an object can impact the valve units so that they are displaced into the open position. In both the open and closed positions, the lower piston surfaces 10 of the valve pistons 8 are arranged inside the flow channel 4 above the outer edge 16, as shown in FIGS. 4A and 4B, and the valve units 6 are thus protected inside the flow channels 4, when the container unit 1 is disconnected from the hydraulic component 1 and the valve unit 6 is in the closed position.

The container unit 1 together with the hydraulic component 2 is defining a system for controlling the flow of brake fluid in a vehicle hydraulic brake system. The system comprises the container unit 1 and the hydraulic component 2, where the hydraulic component 2 is interacting with the container unit 1 when the container unit 1 is connected to the hydraulic component 2. In the system, the container unit 1 comprises the storage chamber 3, and the container unit 3 is provided with the at least one flow channel 4 with the valve unit 6. The hydraulic component 2 comprises the at least one flow port 15 with the protrusion 11, and the at least one flow channel 4 is connectable to the at least one flow port 15. The protrusion 11 is protruding into the flow channel 4 and displacing the valve unit 6 into an open position when the container unit 1 is connected to the hydraulic component 2, and the flow channel 4 is adapted for receiving the protrusion 11 when the container unit 1 is connected to the hydraulic component 2.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Container unit
2: Hydraulic component
3: Storage chamber
4: Flow channel
5: Bottom wall
6: Valve unit
7: Valve member
8: Valve piston
9: Spring
10: Lower piston surface 11: Protrusion
12: Wall section
13: Inner flow opening
14: Outer flow opening
15: Flow port
16: Outer edge
17: Sealing member
18: Fluid channel
19: Lid
20: Filling opening

The invention claimed is:

1. A container unit for brake fluid in a vehicle hydraulic brake system, where the container unit is connectable to a hydraulic component of the brake system for establishing fluid communication therebetween, the container unit comprising:
   a storage chamber for storing the brake fluid, the storage chamber having at least one flow channel that establishes fluid communication between the storage chamber and the hydraulic component, where the storage chamber together with the at least one flow channel defines an inner volume of the container unit;
   at least one displaceable valve unit that regulates flow of brake fluid out from and into the storage chamber through the at least one flow channel, the at least one valve unit comprises a valve member and a valve piston attached to and moving with the valve member, where the valve member has an open position in which the brake fluid flows out from and into the storage chamber so long as the container unit is connected to the hydraulic component and has a closed position in which the brake fluid is prevented from flowing out from the storage chamber during times that the container unit is disconnected from the hydraulic component; and
   a spring that biases the valve member from the open position to the closed position, wherein the spring is connected at a first end to the valve piston and connected at a second end to a bottom wall of the storage chamber such that the spring is located inside of the flow channel below the valve member and above an outer edge of the flow channel at which the flow channel ends,
   wherein the at least one valve unit in the open and closed positions is fully enclosed within the inner space of the container unit;
   wherein the valve piston displaces the valve member between the open and closed positions; and
   wherein, in both the open position and the closed position of the valve member, a lower piston surface of the valve piston at which the valve piston ends is located inside the flow channel and above an outer edge of the flow channel at which the flow channel ends.

2. A container unit according to claim 1,
   wherein the spring, in the open position of the valve member, has a higher compression than in the closed position.

3. A container unit according to claim 1,
   wherein the lower piston surface is configured to interact with the hydraulic component to move the valve piston and displace the valve member into the open position.

4. A container unit according to claim 3,
   wherein the lower piston surface is configured to interact with a protrusion arranged in a flow port of the hydraulic component, and
   where the protrusion protrudes into the flow channel following connection of the container unit to the hydraulic component.

5. A container unit according to claim 1,
   wherein each of the at least one flow channel has an inner flow opening connecting the at least one flow channel to the storage chamber and an outer flow opening at the outer edge of the flow channel.

6. A container unit according to claim 5,
   wherein the valve member, in the closed position, engages the inner flow opening.

7. A container unit according to claim 1,
   wherein the at least one flow channel has a circular cross-section and is formed by a wall section, wherein the valve piston is located inside the wall section of the at least one flow channel.

8. A container unit according to claim 7,
   wherein the wall section of the at least one flow channel is configured to be connected to the hydraulic component.

9. A container unit according to claim 1,
   wherein the at least one flow channel is arranged in a bottom wall of the storage chamber.

10. A container unit according to claim 1,
    wherein the container unit comprises two flow channels, where each flow channel is provided with one valve unit.

11. A system for controlling the flow of brake fluid in a vehicle hydraulic brake system,
    wherein the system comprises the container unit according to claim 1 and the hydraulic component connected to the container unit.

12. A system according to claim 11,
    where the hydraulic component comprises at least one flow port with a protrusion, the at least one flow channel connected to the at least one flow port,
    where the protrusion protrudes into the flow channel and displaces the valve piston to move the valve member into the open position.

13. A system according to claim 11,
    wherein the hydraulic component is a tandem master cylinder.

14. A container unit according to claim 1, wherein the spring is a helical type spring comprising a plurality of helical coils, the valve piston encompassed at least partially within the plurality of helical coils such that the spring at least partial surrounds the valve piston.

* * * * *